US011760348B2

(12) United States Patent
Verma et al.

(10) Patent No.: US 11,760,348 B2
(45) Date of Patent: Sep. 19, 2023

(54) VEHICLE BOUNDARY CONTROL

(71) Applicant: Ford Global Technologies, LLC, Dearborn, MI (US)

(72) Inventors: Himanshu Verma, Farmington Hills, MI (US); Fling Finn Tseng, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 104 days.

(21) Appl. No.: 17/486,271

(22) Filed: Sep. 27, 2021

(65) Prior Publication Data
US 2023/0095407 A1    Mar. 30, 2023

(51) Int. Cl.
*B60W 30/12* (2020.01)
*B60W 40/02* (2006.01)
*B60W 40/114* (2012.01)
*B60W 10/20* (2006.01)
*B60W 40/13* (2012.01)

(52) U.S. Cl.
CPC ............ *B60W 30/12* (2013.01); *B60W 10/20* (2013.01); *B60W 40/02* (2013.01); *B60W 40/114* (2013.01); *B60W 40/13* (2013.01); *B60W 2520/14* (2013.01); *B60W 2555/20* (2020.02); *B60W 2556/65* (2020.02)

(58) Field of Classification Search
CPC ...... B60W 30/12; B60W 10/20; B60W 40/02; B60W 40/114; B60W 40/13; B60W 2555/20; B60W 2556/65; B60W 2520/14
See application file for complete search history.

(56) References Cited

U.S. PATENT DOCUMENTS

| 10,228,696 B2 | 3/2019 | Myers et al. |
| 11,021,150 B2 | 6/2021 | Abdar |
| 2015/0039183 A1 | 2/2015 | Yang et al. |

(Continued)

FOREIGN PATENT DOCUMENTS

| CN | 204116380 U | 1/2015 |
| DE | 102008062752 A1 | 6/2010 |

(Continued)

OTHER PUBLICATIONS

Non-Final Office Action for related U.S. Appl. No. 17/034,483, filed Sep. 28, 2020, as issued by the USPTO dated Jan. 18, 2022.

(Continued)

*Primary Examiner* — Nicholas Kiswanto
*Assistant Examiner* — Jamal A Shah
(74) *Attorney, Agent, or Firm* — Frank A. MacKenzie; Bejin Bieneman PLC

(57) ABSTRACT

A system, comprising a computer including a processor and a memory storing instructions executable by the processor to determine a first lateral boundary for movement of a vehicle. The first lateral boundary is parallel to a longitudinal axis of the vehicle and is based on at least a size of the vehicle. Based on at least the size of the vehicle and a detected yaw rate of the vehicle, the instructions include to determine a wind condition at a location. The instructions include to update a distance of the first lateral boundary from the longitudinal axis to obtain an updated first lateral boundary, based on the wind condition.

16 Claims, 5 Drawing Sheets

(56) References Cited

U.S. PATENT DOCUMENTS

| | | | |
|---|---|---|---|
| 2015/0225015 A1* | 8/2015 | Takeda | B62D 6/008 |
| | | | 701/41 |
| 2017/0197656 A1 | 7/2017 | Oh | |
| 2017/0352276 A1 | 12/2017 | Arndt et al. | |
| 2018/0037259 A1* | 2/2018 | Hawes | G01C 19/44 |
| 2018/0162400 A1 | 6/2018 | Abdar | |
| 2018/0210447 A1* | 7/2018 | Myers | B60W 40/02 |
| 2018/0211520 A1 | 7/2018 | Offenhaeuser et al. | |
| 2018/0292823 A1 | 10/2018 | Wei et al. | |
| 2019/0204833 A1 | 7/2019 | Wei et al. | |
| 2019/0233101 A1 | 8/2019 | Schwindt | |
| 2019/0250274 A1 | 8/2019 | Ito et al. | |
| 2019/0383638 A1 | 12/2019 | Cho | |
| 2020/0057453 A1* | 2/2020 | Laws | B60W 30/18 |
| 2020/0124765 A1 | 4/2020 | Nishimura et al. | |
| 2020/0156623 A1* | 5/2020 | Takaue | B60K 23/04 |
| 2020/0236521 A1 | 7/2020 | Vassilovski et al. | |
| 2020/0317266 A1 | 10/2020 | Kunihiro et al. | |
| 2020/0380787 A1 | 12/2020 | Croxford | |
| 2020/0394907 A1 | 12/2020 | Takamori et al. | |
| 2021/0146803 A1 | 5/2021 | Wu | |
| 2021/0197837 A1 | 7/2021 | Grubwinkler | |
| 2021/0048310 A1 | 12/2021 | George | |
| 2021/0387647 A1* | 12/2021 | Koopman, Jr. | G06N 7/01 |
| 2022/0242422 A1* | 8/2022 | Thompson | B60W 50/0097 |
| 2022/0266852 A1* | 8/2022 | Khayyer | G01C 21/3691 |

FOREIGN PATENT DOCUMENTS

| | | |
|---|---|---|
| DE | 102018221265 A1 | 6/2020 |
| JP | 2017170921 A | 9/2017 |
| KR | 100801417 B1 | 1/2008 |
| KR | 101545054 B1 | 8/2015 |
| WO | 2019066002 A1 | 4/2019 |

OTHER PUBLICATIONS

Notice of Allowance for U.S. Appl. No. 17/034,483 as issued by the USPTO dated Jun. 22, 2022.

* cited by examiner

VEHICLE BOUNDARY CONTROL

BACKGROUND

Vehicles typically include a variety of sensors. The sensors can be placed on or in various parts of the vehicle, e.g., a vehicle roof, a vehicle hood, a rear vehicle door, etc. Some sensors detect the external world, for example, radar sensors, scanning laser range finders, light detection and ranging (LIDAR) devices, and image processing sensors such as cameras. Operation of the vehicle can rely upon acquiring accurate and timely data regarding the vehicle's environment while the vehicle is being operated.

DETAILED DESCRIPTION

Wind along a roadway may exert force on a vehicle. For example, wind can change a path and/or steering responses of the vehicle. Where a vehicle computer may define one or more virtual boundaries within which a vehicle may move during operation; wind acting on the vehicle can affect the vehicle's behavior with respect to a defined boundary. For example, a vehicle boundary can be defined as part of a bounding box around the vehicle, i.e., a set of boundaries around the vehicle defining an area within which the vehicle may operate. Defining virtual boundaries, e.g., a bounding box, for a host or ego vehicle can allow that vehicle to determine its trajectories and/or can allow other vehicles operating near the host vehicle to determine their trajectories.

The present disclosure provides improved techniques for determining virtual boundaries for a vehicle, including determining virtual boundaries based on a wind condition determined to be acting on the vehicle. For example, the vehicle computer may update a bounding box to compensate for wind acting on the vehicle to allow the vehicle and/or other vehicles to operate based on the updated bounding box that is based on a current wind condition.

The improved techniques of the present disclosure include techniques for determining a wind condition based on which a virtual boundary can be updated. For example, as an alternative to, or in addition to, stored data about a likely wind condition at a location, a vehicle at the location can monitor responses of one or more vehicle subsystems that may be affected by a wind condition. In one example, a vehicle computer can monitor responses to steering inputs, and can compare the responses to the steering inputs to the inputs. That is, a steering input may request a first yaw rate (generally the rate at which the vehicle turns to the left or right) but, due to a wind condition, the vehicle may actually turn at a second yaw rate. By analyzing the difference between a requested and actual yaw rate, as described further below, a vehicle computer can determine a wind condition. The wind condition can then be used to update a virtual boundary for the vehicle.

Figure 1:
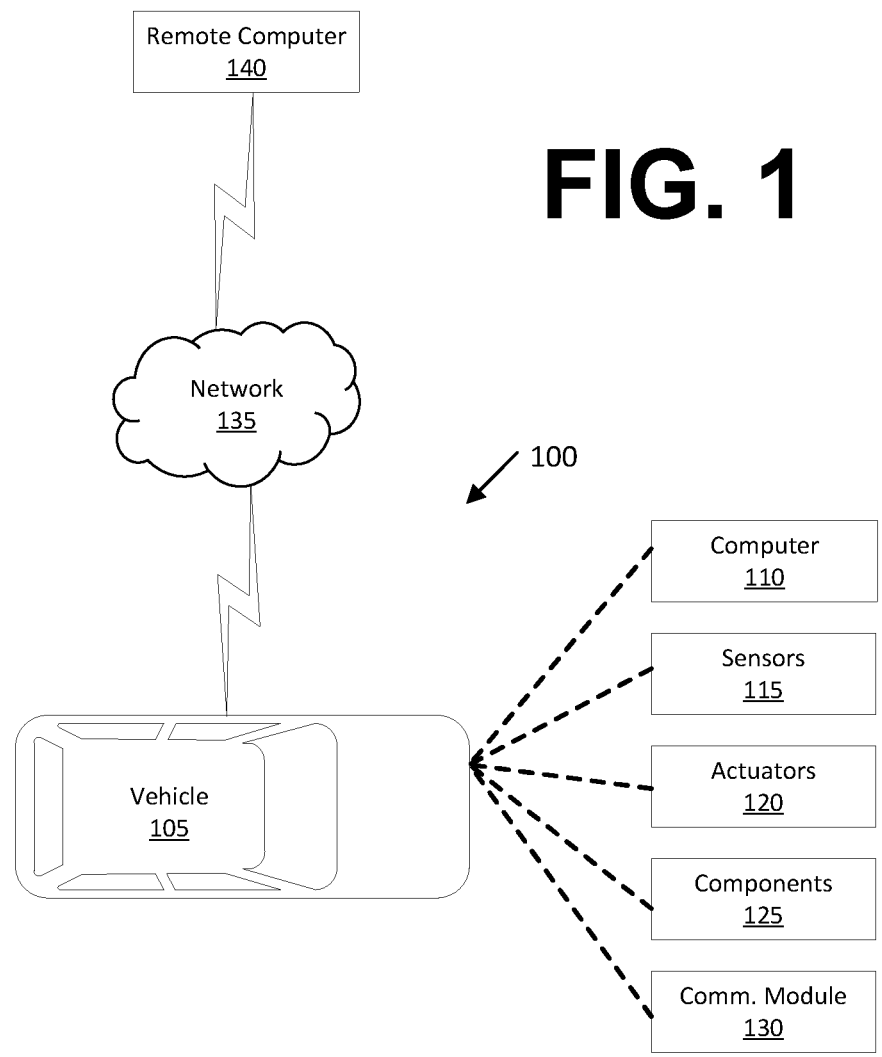
FIG. 1 is a block diagram illustrating an example vehicle system.
Figure 2:
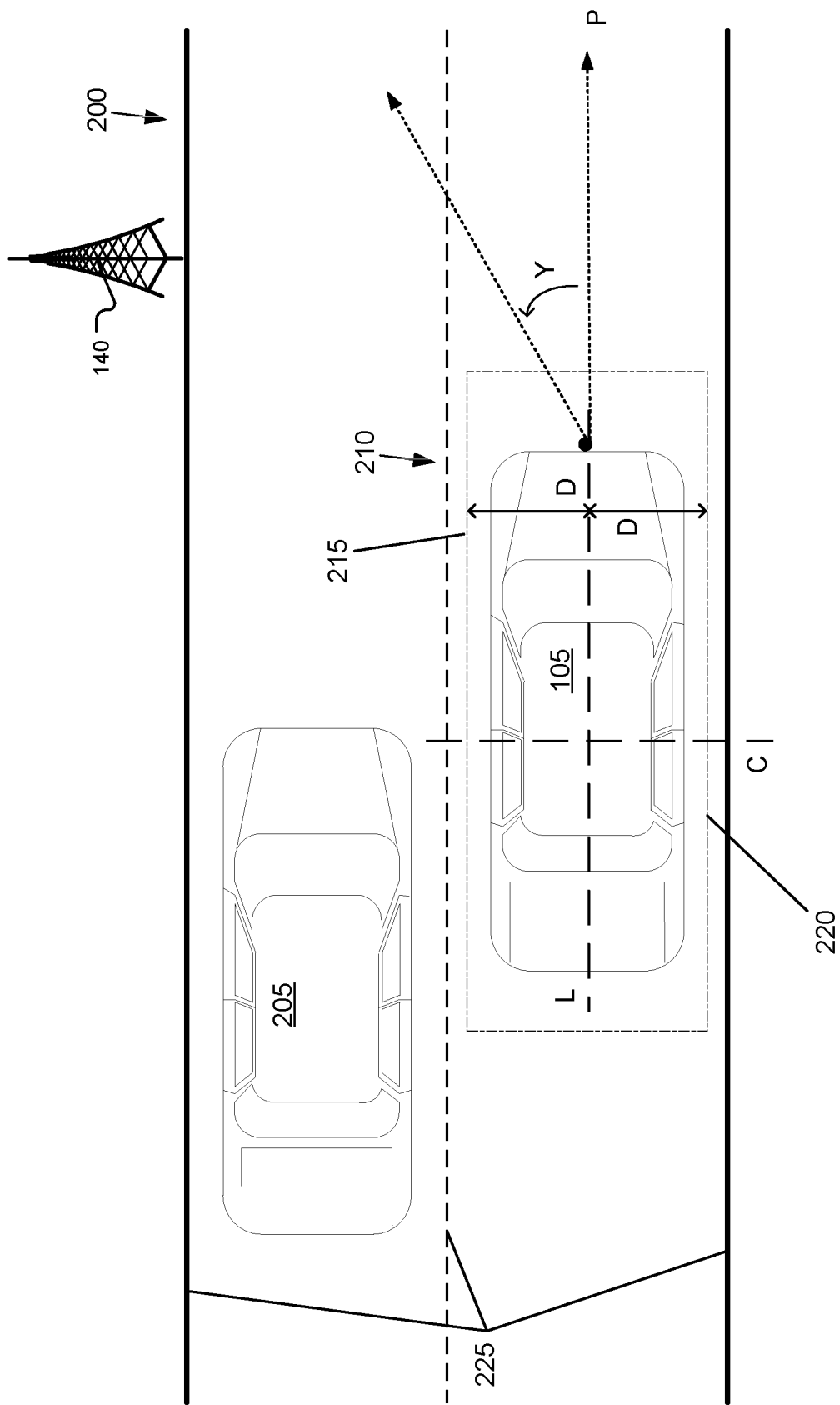
FIGS. 2-4 are diagrams illustrating operation of a vehicle according to the system of FIG. 1.

With reference to FIGS. 1-2, an example vehicle system 100 for virtual boundary control includes a vehicle 105. A vehicle computer 110 in the vehicle 105 receives data from sensors 115 and other vehicle components 125 of the vehicle 105. Based on data from sensors 115 and/or other sources, a vehicle computer 110 can be programmed to determine one or more virtual boundaries within which the vehicle 105 may travel at a given time. A "virtual boundary" for a vehicle 105 means a line, i.e., a set of points, defined by the vehicle computer 110 with respect to a coordinate system in which the vehicle 105 is located. The points in a virtual boundary for a vehicle 105 are defined with respect to the vehicle 105.

A plurality of virtual boundaries for a vehicle 105 can form a bounding box 210 of the vehicle 105, i.e., a boundary within which the vehicle 105 may move at a given time. For example, as illustrated, a first lateral boundary 215 is parallel to a longitudinal axis L of the vehicle 105 and is based on at least a size of the vehicle 105. For example, a default lateral boundary 215, 220 for a given vehicle 105 could be specified (e.g., by a vehicle manufacturer) based on a size, e.g., width, mass, or weight, etc., of the vehicle, and could further be specified based on a vehicle's 105 current speed, acceleration, yaw Y rate, etc. Then, based on at least the size of the vehicle 105 and an actual yaw $Y_{act}$ rate of the vehicle 105 compared to an expected yaw $Y_{exp}$ rate based on steering input, the vehicle computer 110 can be programmed to determine a wind condition at a current location of the vehicle 105. The vehicle computer 110 is programmed to update a distance D of a default or current lateral boundary 215 from a vehicle 105 longitudinal axis L to obtain an updated first lateral boundary 215 based on a determined current wind condition. A second lateral boundary 220 (i.e., on a side of the vehicle 105 opposite the first lateral boundary 215) can be similarly updated. The updated one or more lateral boundaries 215, 200 can be included in an updated bounding box 210.

With reference to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote computer 140 and/or other vehicles 105, e.g., via a messaging or broadcast protocol such as Dedicated Short-Range Communications (DSRC), cellular, and/or other protocol that may support vehicle-to-vehicle, vehicle-to infrastructure, vehicle-to-cloud communications, or the like, and/or via a packet network.

The vehicle computer 110 includes a processor and a memory such as are known. The memory includes one or more forms of computer readable media, and stores instructions executable by the vehicle computer 110 for performing various operations, including as disclosed herein. For example, a vehicle computer 110 may be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, a vehicle computer 110 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The memory may be of any type, e.g., hard disk drives, solid state drives, remote computers 140, or any volatile or non-volatile media. The memory may store the collected data sent from the sensors 115. The memory may be a separate device from the vehicle computer 110, and the vehicle computer 110 may retrieve information stored by the memory via a network 135 in the vehicle 105, e.g., over a CAN bus, a wireless network, etc. Alternatively or additionally, the memory may be part of the vehicle computer 110, e.g., as a memory of the vehicle computer 110.

The vehicle computer 110 may operate the vehicle 105 in an autonomous, a semi-autonomous mode, or a non-autonomous (or manual) mode. For purposes of this disclosure, an autonomous mode is defined as one in which each of vehicle propulsion, braking, and steering are controlled by the vehicle computer 110; in a semi-autonomous mode the vehicle computer 110 controls one or two of vehicle propulsion, braking, and steering; in a non-autonomous mode a human operator controls each of vehicle propulsion, braking, and steering.

The vehicle computer 110 may include programming to operate one or more of vehicle brakes, propulsion e.g., control of acceleration in the vehicle 105 by controlling one or more of an internal combustion engine, electric motor, hybrid engine, etc., steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle network 135 such as a communications bus as described further below, more than one processor, e.g., included in components such as sensors 115, electronic control units (ECUs) or the like included in the vehicle 105 for monitoring and/or controlling various vehicle components 125, e.g., a powertrain controller, a brake controller, a steering controller, etc. The vehicle computer 110 is generally arranged for communications on the vehicle communication network 135 that may include a bus in the vehicle 105 such as a controller area network CAN or the like, and/or other wired and/or wireless mechanisms.

Alternatively or additionally, in cases where the vehicle computer 110 actually comprises a plurality of devices, the vehicle communication network 135 may be used for communications between devices represented as the vehicle computer 110 in this disclosure. Further, as mentioned below, various controllers and/or sensors 115 may provide data to the vehicle computer 110 via the vehicle communication network 135.

The sensors 115 of the vehicle 105 may include a variety of devices such as are known to provide data to the vehicle computer 110. For example, the sensors 115 may include Light Detection And Ranging (LIDAR) sensor(s), etc., disposed on a top of the vehicle 105, behind a vehicle front windshield, around the vehicle 105, etc., that provide sensor data relating to the environment around the vehicle 105. As another example, one or more radar sensors fixed to vehicle bumpers may provide data to provide further sensor data relative to the location of the vehicle 105. The sensors 115 may further alternatively or additionally, for example, include camera sensor(s), e.g. front view, side view, etc., providing images from an area surrounding the vehicle 105. In the context of this disclosure, an object is a physical, i.e., material, item that has mass and that may be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by the remote computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data may include a location of an object, e.g., a vehicle 105, a sign, a tree, a flag, debris, etc., relative to the vehicle 105. The sensors 115 may be mounted to any suitable location in or on the vehicle 105, e.g., on a vehicle bumper, on a vehicle roof, etc., to collect images of the environment around the vehicle 105.

The actuators 120 of the vehicle 105 are implemented via circuits, chips, or other electronic and or mechanical components that may actuate various vehicle subsystems in accordance with appropriate control signals as is known. The actuators 120 may be used to control components, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via the vehicle 105 communication module or interface with devices outside of the vehicle 105, e.g., through a vehicle-to-vehicle (V2V) or vehicle-to-infrastructure (V2X) wireless communications (cellular and/or DSRC, etc.) to another vehicle 205, and/or to a remote computer 140 (typically via direct radio frequency communications). The communications module 130 could include one or more mechanisms, such as a transceiver, by which the computers of vehicles 105 may communicate, including any desired combination of wireless (e.g., cellular, wireless, satellite, microwave, and radio frequency) communication mechanisms and any desired network topology (or topologies when a plurality of communication mechanisms are utilized). Exemplary communications provided via the 130 include cellular, Bluetooth®, IEEE 802.11 (e.g., implementing Wi-Fi®), dedicated short range communications (DSRC), and/or wide area networks (WAN), including the Internet, providing data communication services.

The network 135 represents one or more mechanisms by which the vehicle computer 110 may communicate with remote computing devices, e.g., the remote computer 140, another vehicle computer 110, etc. Accordingly, the network 135 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote computer 140 may be a conventional computing device, i.e., including one or more processors and one or more memories, programmed to provide operations such as disclosed herein. Further, the remote computer 140 may be accessed via the network 135, e.g., the Internet, a cellular network, and/or or some other wide area network.

With reference to FIG. 2, a vehicle 105 is illustrated operating on a roadway 200 upon which the vehicle 105 is operating. The vehicle computer 110 may determine the vehicle 105 is within the roadway 200 based on location data of the vehicle 105 indicating the vehicle 105 is operating within the roadway 200, e.g., using the Global Positioning System (GPS) to determine the location of the vehicle 105 relative to the roadway 200, data from sensors 115 detecting indicia such as lane markings, etc. Sensor 115 data may include various data from an environment around the vehicle 105, e.g., data about other vehicles, objects, lane boundaries 225, infrastructure around the vehicle 105, etc. Sensor data may be from a sensor 115 such as a lidar sensor, a camera sensor, a radar sensor, etc.

The vehicle computer 110 may generate a planned or expected path P to operate the vehicle 105 on the roadway 200, e.g., along one or more roads and/or road lanes. Alternatively, the remote computer 140 may generate the expected path P and provide the expected path P to the vehicle computer 110, e.g., via the network 135. In this document, a "path" of a vehicle 105 means is a set of points, e.g., that may be specified as coordinates with respect to a vehicle coordinate system and/or a global coordinate system, that the vehicle 105 has traversed and/or is expected or planned to traverse. The vehicle computer 110 can be programmed to determine an expected path P with a conventional navigation and/or path planning algorithm. A path may be specified according to one or more path polynomials, for example. As will be understood, a path polynomial is a polynomial function of degree three or less that describes the motion of a vehicle 105 on a ground surface. Motion of a vehicle 105 on the roadway 200 is described by a multi-dimensional state vector that includes vehicle location, orientation speed and acceleration including positions in x, y, z, yaw Y, pitch, roll, yaw Y rate, pitch rate, roll rate, heading velocity and heading acceleration that may be determined by fitting a polynomial function to successive 2D locations included in vehicle motion vector with respect to the ground surface, for example.

Various techniques such as are known may be used to interpret sensor data and/or to classify the environment based on sensor data. For example, camera and/or lidar sensor data may be provided to a classifier that comprises programming to utilize one or more conventional image classification techniques. For example, the classifier may use a machine learning technique in which data known to represent various objects or environmental factors are provided to a machine learning program for training the classifier. Once trained, the classifier may accept as input vehicle sensor data and then provide as output an identification and/or a classification of the environment around the vehicle 105. Further, a coordinate system (e.g., polar or cartesian) applied to an area proximate to the vehicle 105 may be used to specify locations and/or areas (e.g., according to the vehicle coordinate system, translated to global latitude and longitude geo-coordinates, etc.) of environmental factors identified from sensor data, e.g., lane boundaries 225, other vehicles 105, objects around the vehicle 105, trees, etc. Yet further, the vehicle computer 110 could employ various techniques for fusing (i.e., incorporating into a common coordinate system or frame of reference) data from different sensors and/or types of sensors, e.g., lidar, radar, and/or optical camera data.

The lateral boundaries 215, 220 are spaced a distance D from the longitudinal axis L. In the example shown in the Figures, the vehicle computer 110 may define a first lateral boundary 215 extending along the longitudinal axis L of the vehicle 105 and along a side of the vehicle 105. The first lateral boundary 215 is parallel to the longitudinal axis L and spaced the distance D from the longitudinal axis L. In such an example as shown in the Figures, the vehicle computer 110 may define a second lateral boundary 220 parallel to and spaced the distance D from the longitudinal axis L in an opposite direction from the first lateral boundary 215. In other words, the second lateral boundary 220 may extend along an opposite side of the vehicle 105 from the first lateral boundary 215.

Figure 3:
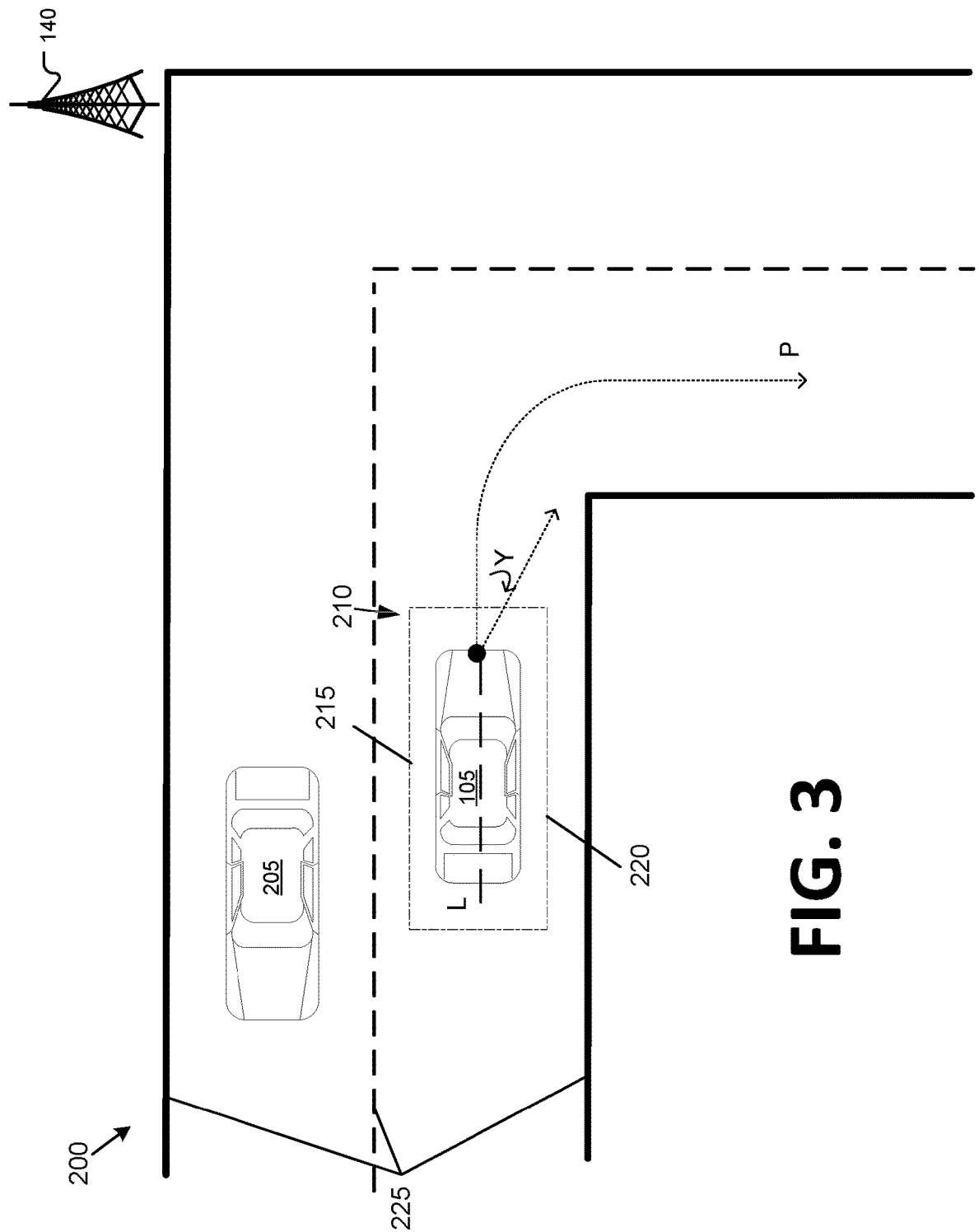

For example, vehicle computer 110 may determine a default bounding box 210 around a vehicle 105. As mentioned above, a default bounding box 210 may be determined based on various factors, e.g., a size of the vehicle 105, a current speed, acceleration, and/or turn (yaw) rate, etc. An example of a yaw Y due to a turn is shown in FIG. 3. In such an example, the expected path P of the vehicle 105 is turning to the right. The yaw Y is determined by the angle from the longitudinal axis L to the right of the vehicle 105; the yaw Y rate is the rate at which this angle changes.

In determining the bounding box 210, the vehicle computer 110 may determine one or more lateral boundaries 215, 220 forming respective sides of the bounding box 210. The lateral boundaries 215, 220 define boundaries within which the vehicle 105 may move laterally during operation of the vehicle 105 on the roadway 200. The lateral boundaries 215, 220 are parallel to and spaced from a longitudinal axis L of the vehicle 105, i.e., the lateral boundaries 215, 220 are spaced from an axis extending generally along a length of the vehicle 105; the longitudinal axis L typically defines a longitudinal center line of the vehicle 105. Specifically, as shown in FIG. 2, the lateral boundaries 215, 220 are the boundaries for the vehicle 105 in a lateral direction C.

As mentioned above, lateral boundaries 215, 220 are typically based on at least a size of the vehicle 105, i.e., on at least one measurement of a physical quantity of the vehicle 105, e.g., a mass, weight, length, width, and/or height of the vehicle. Specifically, the distance D of the lateral boundaries 215, 220 from the longitudinal axis L of the vehicle 105 is based on at least a size of the vehicle 105 and also, advantageously as described herein, can be based on a determination of a wind condition.

The vehicle computer 110 can determine a wind condition, i.e., at least one, and typically both, of a speed and direction of wind exerting a force on the vehicle 105. Wind may exert a force on a side of the vehicle 105 causing the vehicle 105 to deviate from the expected path P. The wind condition can be determined based on at least the size of the vehicle 105 and a deviation in yaw Y rate of the vehicle 105 from an expected yaw rate. That is, the deviation in yaw Y rate may be the difference between an actual yaw $Y_{act}$ rate (i.e., a measured current yaw rate from existing signals from vehicle sensors and/or controllers, e.g., as are typically available via the vehicle CAN bus) and expected yaw $Y_{exp}$ rate (i.e., a yaw rate expected based on a steering input to the vehicle 105). The vehicle computer 110 may first determine the wind speed based on a function of the actual yaw $Y_{act}$ rate, the expected yaw $Y_{exp}$ rate, and the speed of the vehicle 105.

$$W_{spd} = f(Y_{act}, Y_{exp}, V_{spd}) \quad (1)$$

where $W_{spd}$ is the wind speed that is acting on a side of the vehicle 105, $Y_{act}$ is the actual yaw rate of the vehicle 105, $Y_{exp}$ is the expected yaw rate of the vehicle 105, and $V_{spd}$ is the speed of the vehicle 105. The function as shown above may be a linear function or a regression function based on empirical testing of vehicles in various winds conditions. The deviation in yaw Y rate of the vehicle 105 may be determined based on the difference between an actual path of the vehicle 105 and the expected path P due to the wind on the side of the vehicle 105. In other words, the deviation in yaw Y rate is the difference between the actual yaw $Y_{act}$ rate of the vehicle 105 and the expected yaw $Y_{exp}$ rate of the vehicle 105 caused by a current steering input to the vehicle 105. Upon determining the wind speed acting on the side of the vehicle 105, the wind condition, e.g., the force of the wind on the side of the vehicle 105. The force may be determined based on a function of drag on the vehicle 105 caused by the wind speed, for example. The vehicle computer 110 may determine the wind condition, i.e., the force of the wind, based on a function as shown below.

$$F_{wind} = \frac{1}{2} C_d \rho W_{spd}^2 A \quad (2)$$

where $F_{wind}$ is the force of the wind on the side of the vehicle 105, $C_d$ is a drag coefficient, $\rho$ is a density of air, $W_{spd}$ is the wind speed, and A is a reference area, e.g., surface area of the side of the vehicle 105 that the wind is acting on. The reference area A is based on the size of the vehicle 105, e.g., the length, width, and/or height of the vehicle 105, and the angle at which the wind is acting on the side of the vehicle 105. In other examples, the force may be determine by any suitable way, including using the mass and/or weight of the vehicle 105.

Upon determining the wind condition based on the wind speed and size of the vehicle, the vehicle computer 110 can then determine the distance D of the lateral boundaries 215, 220 from the longitudinal axis L. The vehicle computer 110 can update the distance D of the lateral boundaries 215, 220 from the longitudinal axis L, i.e., the distance D of the first lateral boundary 215 and the second lateral boundary 220 from the longitudinal axis L based on the wind condition. In situations where the wind condition has caused the vehicle 105 to deviate from the expected path P, the vehicle computer 110 may update the distance D of the lateral boundaries 215, 220 to be spaced farther from the longitudinal axis L. In such a situation, the vehicle 105 may be more likely to deviate from the expected path P by larger amounts, therefore, increasing the distance D from the longitudinal axis L of the lateral boundaries 215, 220 provides more space for the vehicle 105 to move. In situations where the wind condition has lessened, i.e., creating less deviation from the expected path P, the vehicle computer 110 may update the distance D of the lateral boundaries 215, 220 to be spaced closer from the longitudinal axis L. In such a situation, the vehicle 105 may be less likely to deviate from the expected path P and the distance D from the longitudinal axis L of the lateral boundaries 215, 220 provides less space for the vehicle 105 to move.

For example, the boundaries 215, 220 can be determined as a function, e.g., a weight sum, a weight product, etc., of the size of the vehicle 105 and the wind condition:

$$D(\text{size, wind}) = \frac{C_w F_{wind} + C_s S}{2} \quad (3)$$

where D is the distance D from the longitudinal axis L, $F_{wind}$ is the force of the wind, i.e., the wind condition, S is the size of the vehicle 105, and $C_w$ and $C_s$ are coefficients based on the wind condition and the size of the vehicle 105. The coefficients (or weights) may be predetermined based on empirical testing of the lateral movement of a vehicle 105 operating at various speeds and subjected to various wind conditions, e.g., by positioning the vehicle 105 at various angles relative to a direction of wind in a wind tunnel and using, e.g., an inertial measurement units (IMU), laser metrology, etc., to determine movement of the vehicle 105 in the wind tunnel when being subjected to various wind speeds and directions. $C_w$ and $C_s$ may have specified minimum and maximum values. For example, a maximum weight could be a vehicle width plus some factor to provide a minimum margin around the vehicle, and a maximum could be limited by constraints such as a likely width of a roadway or lane. In one example, $C_w$ and $C_s$ are between a minimum of 1 and a maximum of 1.25 when used to adjust the original value of the distance D from the longitudinal axis L according to (3) above. Thus, when used in (3) above, in this example the weights $C_w$ and $C_s$ together could result in a default distance D, e.g., a distance D specified for a vehicle assume no wind conditions affecting the vehicle, could be adjusted upward at most 50%.

Alternatively or additionally, based on the size of the vehicle 105 and a determined wind condition, the vehicle computer 110 can select the distance D of the lateral boundaries 215, 220 from the longitudinal axis L based on stored data, e.g., stored in a look-up table or the like, specifying distances D for various wind conditions for a vehicle 105, including based on the vehicle size. An example look-up table is shown below (See Table 1). The look-up table may be stored in a memory of the vehicle computer 110. The distances D may be determined empirically, e.g., by determining wind conditions for difference sizes of vehicles, determining the deviation in yaw Y rate, and selecting a distance D for the lateral boundaries 215, 220.

TABLE 1

| Distance | Wind Condition |
|---|---|
| $D_1$ | $W_1$ |
| $D_2$ | $W_2$ |
| $D_3$ | $W_3$ |
| $D_4$ | $W_4$ |
| $D_5$ | $W_5$ |

Figure 4:
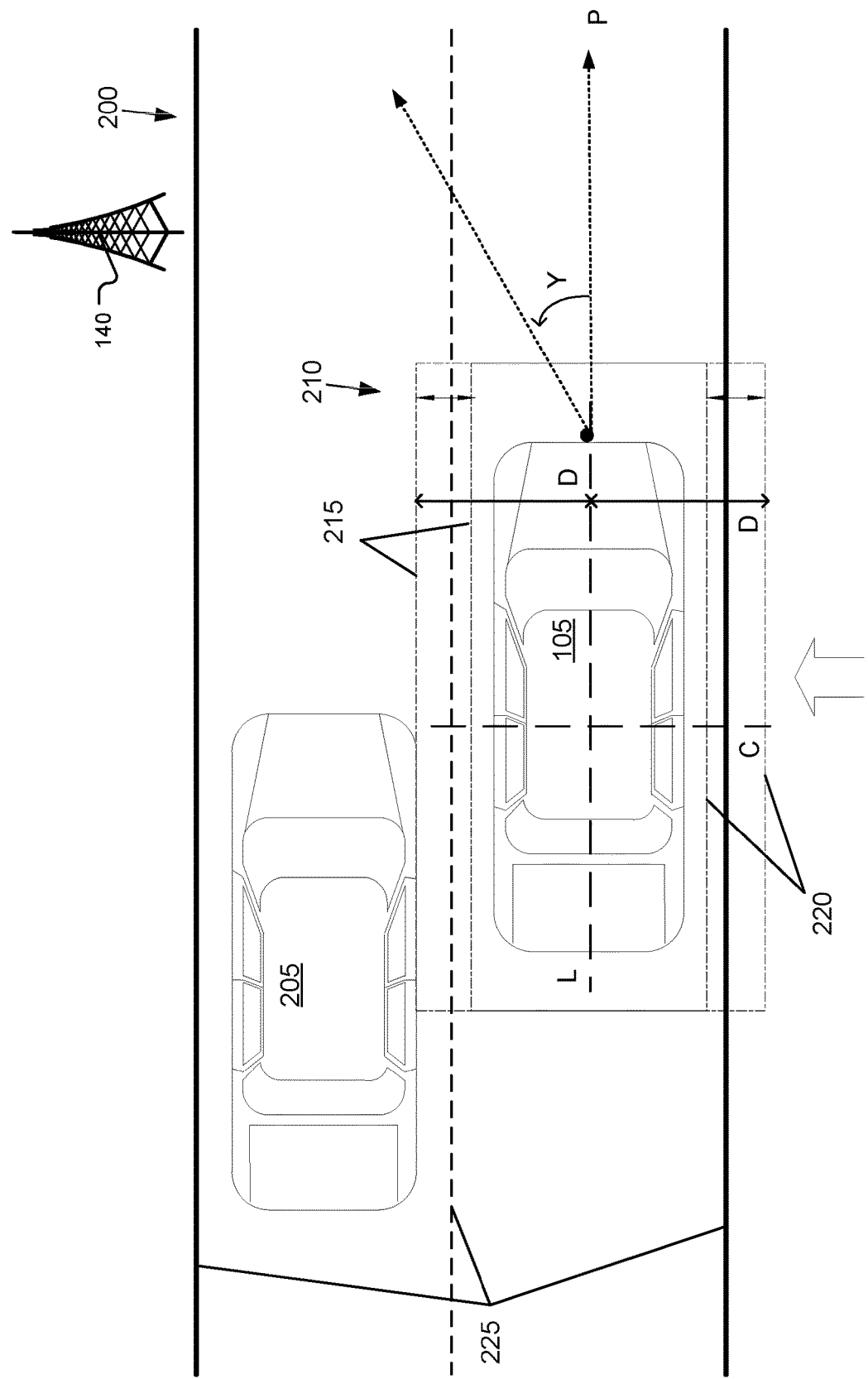

With reference to FIG. 4, updated lateral boundaries 215, 220 can be included in an updated bounding box 210. Further, the vehicle computer 110 may update the distance D of the lateral boundaries 215, 220 from the longitudinal axis L and, therefore, obtain updated lateral boundaries 215, 220, and an updated bounding box 210, any suitable number of times during operation of the vehicle 105.

The distance D of the lateral boundaries 215, 220 from the longitudinal axis L to obtain the updated lateral boundaries 215, 220 may be updated based on one or more of a variety of inputs. For example, the vehicle computer 110 may receive a user input, such as from an occupant of the vehicle 105, and/or could be programmed to periodically or continuously update the distance D (e.g., determine a bounding box 210). The updated lateral boundaries 215, 220 may be determined based on the user input.

As another example, the distance D of the lateral boundaries 215, 220 from the longitudinal axis L to obtain the updated lateral boundaries 215, 220, may be updated based on a location of a lane boundary 225 relative to the vehicle 105, such as, for example, a lane line on the roadway 200. For example, if a vehicle 105 is within a threshold distance D of a lane marking, the vehicle computer 110 could be programmed to continuously or periodically update the distance D. As shown in the example of FIG. 4, the updated lateral boundaries 215, 220 may move nearer or farther from the longitudinal axis L as the distance D is updated.

The vehicle computer 110 may transmit messages from the vehicle 105 to other vehicles 105 on the roadway 200 or to a remote computer 140, e.g., using V2X communications, the network 135, etc., as mentioned above. The vehicle computer 110 may transmit a message to a remote computer 140 specifying the wind condition on the roadway 200 in the area. The wind condition data may be stored in the remote computer 140 for future use by the vehicle 105 or other vehicles 205 to determine a future wind condition on the roadway 200. The vehicle computer 110 may additionally transmit a message to at least one second vehicle 205 specifying the wind condition. The vehicle computer 110 may transmit a message to at least one second vehicle 205 specifying the updated lateral boundaries 215, 220 i.e., the updated first lateral boundary 215 and the updated second lateral boundary 220. The vehicle computer 110 may transmit a message to each vehicle 105 with a predetermined distance D from the vehicle 105 regarding the updated lateral boundaries 215, 220 and the wind condition.

The vehicle computer 110 may actuate a vehicle component 125 to compensate for the wind condition on the side of the vehicle 105. The vehicle computer 110 may actuate a vehicle component 125 based on a yaw Y rate expected to result from the wind condition, e.g., the difference or deviation between the actual yaw $Y_{act}$ rate and the expected yaw $Y_{exp}$ rate of a steering input to the vehicle 105. In situations where the wind condition acts on the vehicle 105 and the vehicle 105 is expected to deviate from the expected path P, i.e., the actual yaw $Y_{act}$ rate is caused by the wind condition, the vehicle computer 110 may actuate a vehicle component 125 to compensate for the wind condition to correct the deviation from the expected path P. For example, the vehicle component 125 that is actuated may include a steering component. In such an example, the vehicle computer 110 may actuate the steering component to maneuver the vehicle 105 to compensate for the wind condition acting on the vehicle 105 and to maneuver the vehicle 105 to travel according to the expected path P. As another example, the vehicle component 125 actuated may include a propulsion or braking component. In such an example, the vehicle computer 110 may alternatively or additionally actuate the propulsion or braking component to control vehicle speed to either increase vehicle speed or decrease vehicle speed. Such an example may apply if the vehicle 105 is passing or moving behind a second vehicle 205 on the roadway 200 to compensate for the wind condition acting on the vehicle 105. As another example, the vehicle component 125 that is actuated may alternatively or additionally include a communication component. In such an example, the communication component may broadcast a message around the roadway 200 upon which the vehicle 105 is operating, e.g., to a second vehicle 205, infrastructure, etc. The vehicle computer 110 may actuate any combination of the above-mentioned vehicle components 125 and/or other suitable vehicle components 125.

Figure 5:
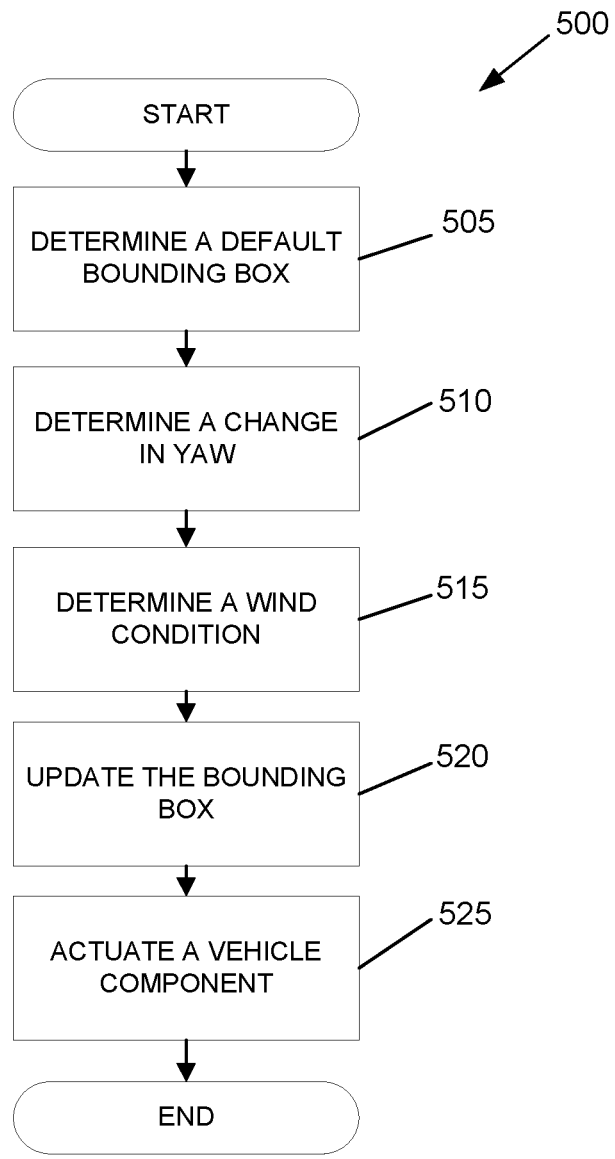
FIG. 5 is a flowchart of an example process for determining an updated bounding box for a vehicle.

FIG. 5 is a diagram of an example process 500 for updating a bounding box 210 while operating a vehicle 105. The process begins in a block 505. The process may be carried out by the vehicle computer 110 included in the vehicle 105 executing program instructions stored in a memory thereof.

In the block 505, the vehicle computer 110 determines at least one default lateral boundary 215, and typically a default bounding box 210 including boundaries 215, 220, for the vehicle 105.

In the block 510, the vehicle computer 110 determines a deviation in a yaw Y rate of the vehicle 105 as described above.

In the block 515, the vehicle computer 110 determines the wind condition based on the deviation in yaw Y rate and the size of the vehicle 105 as described by the equations discussed above. The size of the vehicle 105 may be stored by the vehicle computer 110.

In the block 520, the vehicle computer 110 updates the default bounding box 210 of the vehicle 105 based on the determined the wind condition.

In the block 525, the vehicle computer 110 actuates one or more vehicle components 125 based on the wind condition. As discussed above, the vehicle component 125 may be a steering component, a propulsion or braking component, a communication component, etc., or any combination thereof. For example, the vehicle computer 110 could actuate a change in response to steering inputs to better match an expected and actual yaw rate. In another example, the vehicle computer 110 could broadcast a message indicating the wind condition and the updated bounding box 210 to an area around the vehicle 105 as described above.

The process 500 ends following the block 530.

Vehicle computer 110 executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by the vehicle computer 110. Such a medium may take many forms, including, but not limited to, non-volatile media and volatile media. Instructions may be transmitted by one or more transmission media, including fiber optics, wires, wireless communication, including the internals that comprise a system bus coupled to a processor of the vehicle computer 110. Common forms of computer-readable media include, for example, RAM, a PROM, an EPROM, a FLASH-EEPROM, any other memory chip or cartridge, or any other medium from which the vehicle computer 110 can read.

The above description is intended to be illustrative and not restrictive. Many embodiments and applications other than the examples provided would be apparent to those of skill in the art upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory storing instructions executable by the processor to: determine a first lateral boundary for movement of a vehicle, wherein the first lateral boundary is parallel to a longitudinal axis of the vehicle and is based on at least a size of the vehicle; based on at least the size of the vehicle and a detected yaw rate of the vehicle, determine a wind condition at a location; update a distance of the first lateral boundary from the longitudinal axis, to obtain an update d first lateral boundary, based on the wind condition; and actuate a vehicle component based on the detected yaw rate of the vehicle.

2. The system of claim 1, wherein the instructions to update the distance of the first lateral boundary from the longitudinal axis to obtain the updated first lateral boundary include instructions to determine a difference between the detected yaw rate and a yaw estimated to result from a current steering input.

3. The system of claim 1, wherein the instructions further include instructions to determine the wind condition based at least in part on determining a deviation of a yaw rate expected based on steering input to the vehicle and the detected yaw rate of the vehicle.

4. The system of claim 1, wherein the instructions further include instructions to determine a second lateral boundary that is parallel to the longitudinal axis of the vehicle and is spaced from the longitudinal axis in an opposite direction from the first lateral boundary.

5. The system of claim 4, wherein the instructions further include instructions to update a distance of the second lateral boundary from the longitudinal axis to obtain an updated second lateral boundary, based on the wind condition.

6. The system of claim 1, wherein the instructions further include instructions to transmit a message to a remote computer specifying the wind condition.

7. The system of claim 1, wherein the instructions further include instructions to transmit a message to at least one second vehicle specifying the updated first lateral boundary.

8. The system of claim 1, wherein the instructions further include instructions to transmit a message to at least one second vehicle specifying the wind condition.

9. The system of claim 1, wherein the wind condition includes at least a wind speed and a wind direction.

10. The system of claim 1, wherein the vehicle component is a steering component.

11. The system of claim 1, wherein the vehicle component is a propulsion or braking component.

12. The system of claim 1, wherein the size of the vehicle includes at least one of a weight or a mass of the vehicle.

13. The system of claim 1, wherein determining the wind condition is determined in part from vehicle sensor data.

14. The system of claim 1, wherein determining the wind condition is determined in part from data received in the vehicle from a remote computer.

15. The system of claim 1, wherein the instructions further include instructions to receive a user input that is included in determining the updated first lateral boundary.

16. The system of claim 1, wherein the instructions to update the distance of the first lateral boundary from the longitudinal axis to obtain the updated first lateral boundary further include instructions to update the distance based in part on a location of a lane boundary.

\* \* \* \* \*

UNITED STATES PATENT AND TRADEMARK OFFICE
CERTIFICATE OF CORRECTION

PATENT NO. : 11,760,348 B2
APPLICATION NO. : 17/486271
DATED : September 19, 2023
INVENTOR(S) : Himanshu Verma et al.

It is certified that error appears in the above-identified patent and that said Letters Patent is hereby corrected as shown below:

In the Claims

Claim 13, Column 12, Line 32: replace "wherein determining the wind" with "--wherein the wind--"

Claim 14, Column 12, Line 34: replace "wherein determining the wind" with "--wherein the wind--"

Signed and Sealed this
Fourteenth Day of November, 2023

Katherine Kelly Vidal
*Director of the United States Patent and Trademark Office*